(12) United States Patent  (10) Patent No.: US 7,445,733 B2
Arakawa et al.  (45) Date of Patent: Nov. 4, 2008

(54) PROCESS FOR PRODUCING AN ANTIREFLECTION FILM

(75) Inventors: Fumihiro Arakawa, Tokyo (JP); Hiroko Suzuki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 11/892,623

(22) Filed: Aug. 24, 2007

(65) Prior Publication Data

US 2008/0032058 A1 Feb. 7, 2008

Related U.S. Application Data

(63) Continuation of application No. 11/252,745, filed on Oct. 19, 2005, now abandoned, which is a continuation of application No. 09/804,081, filed on Mar. 13, 2001, now abandoned.

(30) Foreign Application Priority Data

Mar. 16, 2000 (JP) ............................. 2000-074347

(51) Int. Cl.
*B29D 7/01* (2006.01)
(52) U.S. Cl. ...................... 264/1.34; 264/1.38; 359/900
(58) Field of Classification Search ................. 359/599, 359/601, 613, 614, 900; 264/1.1, 1.31, 1.34, 264/1.38
See application file for complete search history.

(56) References Cited

U.S. PATENT DOCUMENTS

| 4,013,465 | A | 3/1977 | Clapham et al. |
| 4,382,983 | A | 5/1983 | Yuhama et al. |
| 5,694,247 | A | 12/1997 | Ophey et al. |
| 5,847,795 | A | 12/1998 | Satoh et al. |
| 5,914,825 | A | * 6/1999 | Nishio et al. ................. 359/851 |
| 5,925,438 | A | 7/1999 | Ota et al. |
| 6,064,524 | A | 5/2000 | Oka et al. |
| 6,217,176 | B1 | 4/2001 | Maekawa |
| 6,489,015 | B1 | 12/2002 | Tsuchiya et al. |

* cited by examiner

*Primary Examiner*—Alessandro Amari
(74) *Attorney, Agent, or Firm*—Oliff & Berridge, PLC (57) ABSTRACT

An object of the present invention is to eliminate drawbacks of conventional multi-layered antireflection films, that is, that a lot of time is required in the formation of a transparent conductive thin film and a low-refractive index layer leading to low processing speed, the corrosion resistance of the transparent conductive thin film is unsatisfactory, and the reflectance over the whole visible light region is not constant. This object can be attained by adopting a structure comprising: a transparent layer 3, with a pencil hardness of H or more, formed of a cured product of an ionizing radiation-curable resin composition; provided on one side of the transparent layer 3, a concave-convex portion 2 comprising innumerable fine concaves and convexes provided at a pitch of not more than the wavelength of light; a transparent substrate film 1 optionally provided on the transparent layer 3 on its side remote from the concave-convex portion 2; and a cover layer, having a lower refractive index than the transparent layer, preferably provided on the fine concaves and convexes.

3 Claims, 4 Drawing Sheets

PROCESS FOR PRODUCING AN ANTIREFLECTION FILM

This is a Continuation of application Ser. No. 11/252,745 filed Oct. 19, 2005, which is a Continuation of application Ser. No. 09/804,081 filed Mar. 13, 2001. The entire disclosures of the prior applications are hereby incorporated by reference in their entirety.

TECHNICAL FIELD

The present invention relates to an antireflection film which can prevent a lowering in visibility of various articles caused by the glare of light as a result of the reflection of light from the surface of the articles.

The present invention also relates to an antireflection film which can develop antireflection properties by virtue of the adoption of a structure of fine concaves and convexes, at a pitch of not more than the wavelength of light, present on the surface thereof, and a polarizing element and a display device using the antireflection film.

BACKGROUND OF THE INVENTION

Liquid-crystal displays, CRT (cathode-ray tube) displays, plasma displays or other displays are required to have high visibility of images displayed on these displays. The reflection of external light from the surface of displays, however, significantly lowers the visibility.

Regarding materials other than displays, for example, building materials of metals or glass, for example, having a gloss surface sometimes cause unprepared light reflection which is obstacle to the way of vehicles and pedestrians.

In order to eliminate the problem of a lowering in visibility of displayed images and the various problems involved, for example, in building materials, caused by the reflection of external light, various antireflection films have been proposed.

A representative example of the proposed antireflection films is an antireflection member described in Japanese Patent Laid-Open No. 80205/1997. This antireflection member comprises a transparent substrate, a hardcoat, and an antireflection optical thin film having a two-layer structure provided in that order. The first layer of the antireflection optical thin film is formed of $SnO_2$, $ZnO$, $In_8O_3$, ITO or the like, and the second layer of the antireflection optical thin film is formed of $SiO_2$, $MgF_2$ or other material having a lower refractive index than the first layer of the antireflection optical thin film. Thus, the claimed advantage of this antireflection member is such that the hardcoat eliminates the susceptibility to scratching, the first layer of the antireflection optical thin film offers antistatic properties, and the first and second layers of the antireflection optical thin film prevent reflection.

In the antireflection member having the above construction, however, a thickness of several tens of nm is necessary for each of the first and second layers of the antireflection optical thin film. An attempt to form these layers, for example, by sputtering requires a lot of time which thus disadvantageously results in low processing speed.

In addition, transparent conductive thin layers formed of ITO or the like posses excellent transparency, but on the other hand, disadvantageously, the corrosion resistance is unsatisfactory.

Further, in the antireflection member having the above construction, the reflectance on red light side and blue light side in the visible light region (wavelength 450 nm to 650 nm), in which humans feels glaring, is not satisfactorily evenly lowered. Specifically, since the antireflection properties vary depending upon the wavelength or incident angle of incident light, a lowering in reflectance in the whole visible light region is not realized and, in this case, a change in color or glare is left.

Further, the antireflection member cannot satisfactorily cope with scratch and stain caused at the time of handling.

For example, for a fine concave-convex film comprising a fine concave-convex portion provided at a pitch of not more than the wavelength of light on the surface of a transparent acrylic resin film or the like, it is known that, at the bottom of concaves and convexes, a major proportion thereof is accounted for by the acrylic resin and, thus, the refractive index of this portion limitlessly becomes close to the light refractive index of the acrylic resin per se (about 1.49), while, toward the surface side of the concaves and convexes, the proportion of the acrylic resin lowers and, instead, the proportion of air increases to provide lower refractive index and, around the outermost surface, the refractive index limitlessly becomes close to the refractive index of air (1.0), whereby the provision of the concaves and convexes has the same effect as a stack of a plurality of layers which have successively varied light refractive indexes.

The use of the fine concave-convex film as an antireflection film, as compared with the conventional construction of a stack of a plurality of layers for constituting an interference layer, has advantages including that a change in color according to the visual angle is less likely to take place, the number of layers constituting the structure is small and, thus, the structure is simple, but on the other hand, this fine concave-convex film is disadvantageous in that, since the surface is formed of very fine concaves and convexes, the film is likely to be scratched.

Further, in the production of the concave-convex film, a method is adopted which comprises providing a visible light-curable or other resin composition (a photoresist), creating cured portions and uncured portions through the utilization of the interference of visible light laser, and performing dissolution development to form fine concaves and convexes. This method requires a lot of time in exposure and development, and, thus, is unsuitable for mass reproduction. Further, a resin composition having a relatively low molecular weight suitable for this process is used as the raw material. Therefore, even in the cured portion, the hardness is not very high, and, thus, the surface hardness is also unsatisfactory.

DISCLOSURE OF THE INVENTION

Accordingly, it is an object of the present invention to eliminate the drawbacks of the prior art, that is, low processing speed due to the necessity of a lot of time for the formation of the transparent conductive thin layer and the formation of the low-refractive index layer, unsatisfactory corrosion resistance of the transparent conductive thin layer, and uneven reflectance in the whole visible light region.

According to the present invention, a film having on its surface fine concaves and convexes, which has solved the above problems of the prior art, can be realized by providing a mold having on its surface fine concaves and convexes, bringing a curable resin composition into contact with the surface of the mold, optionally covering the curable resin composition with a transparent substrate, curing the curable resin composition, and, after curing, separating the cured product of the curable resin composition.

The first invention relates to an antireflection film comprising: a transparent layer formed of a cured product of an ionizing radiation-curable resin composition; and a concave-convex portion provided on one side of the transparent layer, the concave-convex portion comprising innumerable fine concaves and convexes provided at a pitch of not more than the wavelength of light.

The second invention relates to the antireflection film according to the first invention, wherein the transparent layer is backed by a transparent substrate film.

The third invention relates to the antireflection film according to the first or second invention, wherein the transparent layer has a surface hardness of not less than H in terms of pencil hardness.

The fourth invention relates to the antireflection film according to any one of the first to third inventions, which further comprises, stacked on the concaves and convexes, a layer formed of a resin composition having lower light refractive index than the transparent layer.

The fifth invention relates to the antireflection film according to any one of the first to fourth inventions, which has antistatic properties.

The sixth invention relates to a polarizing element comprising: a polarizing plate; and, stacked on the polarizing plate, the antireflection film according to any one of the first to fifth inventions.

The seventh invention relates to a display device comprising: a display section; and, stacked or disposed on the display section in its viewer side, the antireflection film according to any one of the first to fifth inventions or the polarizing element according to the sixth invention.

The eighth invention relates to a process for producing an antireflection film, comprising the steps of: providing a mold with an uneven surface having innumerable fine concaves and convexes at a pitch of not more than the wavelength of light; applying, onto the mold, an ionizing radiation-curable resin composition in an amount large enough to at least fill the concaves of the mold surface; after the application of the ionizing radiation-curable resin composition, covering the top of the applied resin composition with a transparent substrate film; after covering, curing the ionizing radiation-curable resin composition located between the transparent substrate film and the mold to produce a cured product of the ionizing radiation-curable resin composition; and then separating the cured product from the mold.

The ninth invention relates to the process for producing an antireflection film according to the eighth invention, wherein the transparent substrate film on its side for covering the ionizing radiation-curable resin composition is separable and which further comprises the step of separably adhering the transparent substrate film, in curing the ionizing radiation-curable resin composition to produce a cured product, onto the cured product and separating the transparent substrate film from the cured product during, before or after the separation of the cured product from the mold.

The tenth invention relates to the process for producing an antireflection film according to the eighth invention, which further comprises the step of adhering the transparent substrate film, in curing the ionizing radiation-curable resin composition to produce a cured product, onto the cured product and, in separating the cured product from the mold, separating the transparent substrate film together with the cured product.

The eleventh invention relates to the process for producing an antireflection film according to any one of the eighth to tenth inventions, wherein the mold with an uneven surface having fine concaves and convexes is provided by forming concaves and convexes of the mold in a photosensitive resin by a laser beam interference method to produce an original mold and then producing a metallic stamper from the original mold by a plating method.

BEST MODE FOR CARRYING OUT THE INVENTION

Figure 1A:
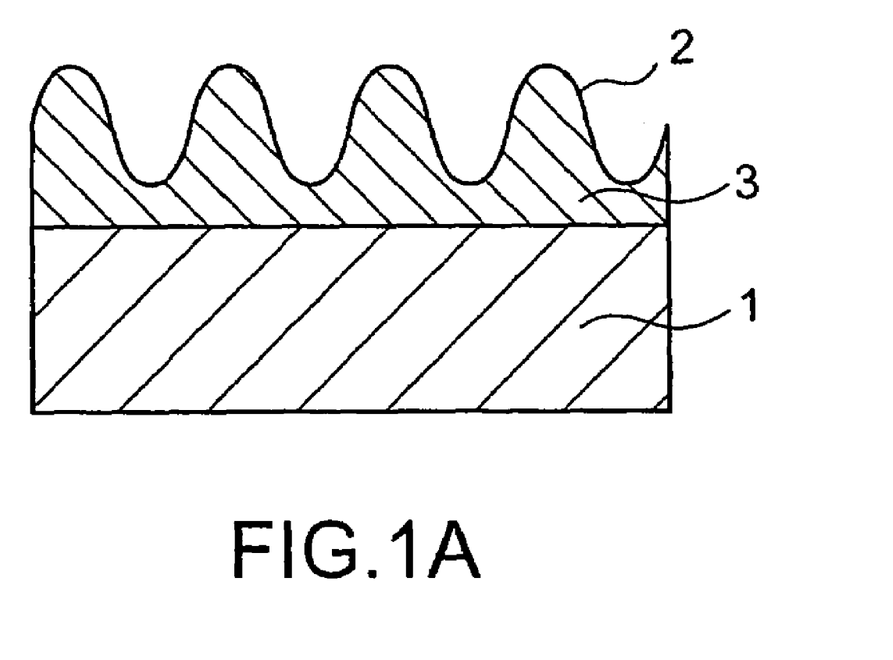
FIGS. 1A and 1B are cross-sectional views showing the stack structure of an antireflection films.

For example, as shown in FIG. 1A, an antireflection film 1 according to the present invention comprises: a transparent substrate film 1; and, stacked on the transparent substrate film 1, a transparent layer 3 having on its top surface a concave-convex portion 2 having innumerable fine concaves and convexes at a pitch of not more than the wavelength of light. In general, the transparent layer 3 is a continuous layer. When the transparent substrate film 1 is provided, however, the transparent layer 3 may be formed of a group of discrete convexes.

Figure 1B:
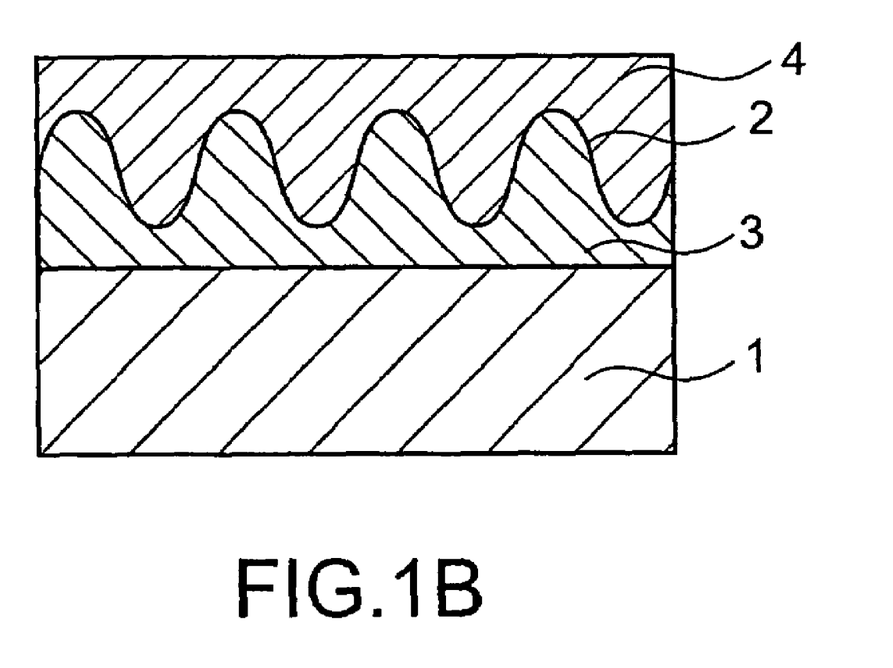

Alternatively, as shown in FIG. 1B, the antireflection film 1 may further comprise a surface layer 4, constituted by a different transparent layer, stacked on the concave-convex portion 2 located on the surface of the transparent layer 3. In the drawing, the top of the surface layer 4 is shown as being flat. The surface layer, however, may have a form conformed to the form of the concave-convex portion 2.

In both the embodiments shown in FIGS. 1A and 1B, the transparent substrate film 1 may not be provided.

Further, in both the embodiments shown in FIGS. 1A and 1B, the provision of the concave-convex portion 2 is not limited to the provision thereof on one side of the antireflection film 1, and the concave-convex portion 2 may be formed on both sides of the antireflection film 1.

Preferably, the transparent substrate film 1 is transparent and smooth and is free from the inclusion of foreign matter. Further, the transparent substrate film 1 preferably has mechanical strength for fabrication and product use reasons. When heat of the display is conveyed to the antireflection film, the transparent substrate film 1 preferably has heat resistance.

Thermoplastic resin films, for example, cellulose diacetate, cellulose triacetate, cellulose acetate butyrate, polyester, polyamide, polyimide, polyether sulfone, polysulfone, polypropylene, polymethylpentene, polyvinyl chloride, polyvinyl acetal, polyether ketone, methyl polymethacrylate, polycarbonate, and polyurethane, are generally preferred as the transparent substrate film 1.

Polyesters, which are frequently used in photographic films coated with a photographic emulsion, are preferred from the viewpoints of mechanical strength and suitability for coating. Cellulose triacetate and the like are preferred from the viewpoints of high transparency, the freedom from optical anisotropy, and low refractive index, and polycarbonates are preferred from the viewpoints of transparency and heat resistance.

These thermoplastic resin films are flexible and easy to use and, including the time of handling, are not required to be bent at all, and, when a hard product is desired, plates, such as the resin plate or the glass plate, may also be used.

The thickness of the transparent substrate film 1 is preferably about 8 to 1000 μm, more preferably about 25 to 300 μm. In the case of plates, the thickness may exceed the above upper limit.

In the transparent substrate film 1, in order to improve the adhesion to a layer formed on the upper surface thereof, or layers formed on respective upper and lower surfaces thereof, in general, the transparent substrate film 1 may be subjected to conventional various treatments, that is, physical treatments, such as corona discharge treatment or oxidation, or alternatively, a primer layer (not shown) may be formed on the transparent substrate film 1 by previously coating a coating composition called an anchor agent or a primer.

The transparent layer 3 provided with the concave-convex portion 2 of innumerable fine concaves and convexes is formed of a cured product of an ionizing radiation-curable resin composition.

Preferably, the ionizing radiation-curable resin composition is high in curing speed in the formation of the concave-convex portion 2 by casting using a mold, and comes to have high scratch resistance after curing from the viewpoint of avoiding the scratch of the surface of the transparent layer 3.

The ionizing radiation-curable resin composition is more preferably such that the hardness after curing is not less than "H" as measured by a pencil hardness test according to JIS K 5400.

Regarding the light refractive index of the transparent layer 3, lower refractive index is preferred from the viewpoint of antireflection properties. From the viewpoint of long-term use as the antireflection film, however, the surface should have fastness properties, particularly scratch resistance. In this case, higher hardness is advantageous, and, thus, the density should be increased to enhance the hardness. For this reason, the light refractive index of the transparent layer 3 is preferably 1.4 to 1.7, more preferably not more than 1.6.

The ionizing radiation-curable resin composition may be a mixture prepared by properly mixing prepolymer, oligomer, and/or monomer, having a polymerizable unsaturated bond or an epoxy group in the molecule thereof, together. The ionizing radiation refers to electromagnetic radiations or charged particle beams which have energy quantum high enough to polymerize or crosslink the molecule. In general, ultraviolet light or electron beam is used.

Examples of prepolymers and oligomers usable in the ionizing radiation-curable resin composition include: unsaturated polyesters, such as condensation products between unsaturated dicarboxylic acids and polyhydric alcohols; methacrylates, such as polyester methacrylate, polyether methacrylate, polyol methacrylate, and melamine methacrylate; acrylates, such as polyester acrylate, epoxy acrylate, urethane acrylate, polyether acrylate, polyol acrylate, and melamine acrylate; and cationically polymerizable epoxy compounds.

Examples of monomers usable in the ionizing radiation curable resin composition include: styrene monomers, such as styrene and α-methylstyrene; acrylic esters, such as methyl acrylate, α-ethylhexyl acrylate, methoxyethyl acrylate, butoxyethyl acrylate, butyl acrylate, methoxybutyl acrylate, and phenyl acrylate; methacrylic esters, such as methyl methacrylate, ethyl methacrylate, propyl methacrylate, methoxyethyl methacrylate, ethoxymethyl methacrylate, phenyl methacrylate, and lauryl methacrylate; unsaturated substituted-type substituted amino alcohol esters, such as 2-(N,N-diethylamino)ethyl acrylate, 2-(N,N-dimethylamino)ethyl acrylate, 2-(N,N-dibenzylamino)methyl acrylate, and 2-(N,N-diethylamino)propyl acrylate; unsaturated carboxylic acid amides, such as acrylamide and methacrylamide; compounds, such as ethylene glycol diacrylate, propylene glycol diacrylate, neopentyl glycol diacrylate, 1,6-hexanediol diacrylate, and triethylene glycol diacrylate; polyfunctional compounds, such as dipropylene glycol diacrylate, ethylene glycol diacrylate, propylene glycol dimethacrylate, and diethylene glycol dimethacrylate; and/or polythiol compounds having two or more thiol groups in the molecule thereof, for example, trimethylolpropane trithioglycolate, trimethylolpropane trithiopropylate, and pentaerythritol tetrathioglycolate.

In general, one of or a mixture of two or more of the above compounds may be optionally used as the monomer in the ionizing radiation-curable resin composition. In this case, from the viewpoint of imparting ordinary suitability for coating to the ionizing radiation-curable resin composition, the content of the prepolymer or oligomer is preferably not less than 5% by weight, and the content of the monomer and/or polythiol compound is not more than 95% by weight.

When flexibility is required of a cured product of the ionizing radiation-curable resin composition, the amount of the monomer may be reduced, or alternatively, an acrylate monomer with the number of functional groups being one or two may be used. On the other hand, when abrasion resistance, heat resistance, and solvent resistance are required of the cured product of the ionizing radiation-curable resin composition, the ionizing radiation-curable resin composition may be designed, for example, so that an acrylate monomer having three or more functional groups is used. Monomers having one functional group include 2-hydroxy acrylate, 2-hexyl acrylate, and phenoxyethyl acrylate. Monomers having two functional groups include ethylene glycol diacrylate and 1,6-hexanediol diacrylate. Monomers having three or more functional groups include trimethylolpropane triacrylate, pentaerythritol tetraacrylate, pentaerytritol tetraacrylate, and dipentaerythritol hexaacrylate.

A resin not curable upon exposure to an ionizing radiation may also be added to the ionizing radiation-curable resin composition in order to regulate properties, for example, the flexibility and surface hardness of the cured product of the ionizing radiation-curable resin composition. Specific examples of resins usable herein include thermoplastic resins, such as polyurethane resins, cellulosic resins, polyvinyl butyral resins, polyester resins, acrylic resins, polyvinyl chloride resins, and polyvinyl acetate resins. Among them, the addition of polyurethane resin, cellulosic resin, polyvinylbutyral resin or the like is preferred from the viewpoint of improving the flexibility.

When the ionizing radiation-curable resin composition is cured by ultraviolet irradiation, a photopolymerization initiator or a photopolymerization accelerator may be added. Photopolymerization initiators usable in the case of a resin system having a radically polymerizable unsaturated group include acetophenones, benzophenones, thioxanthones, benzoin, and benzoin methyl ether. They may be used alone or as a mixture of two or more. On the other hand, photopolymerization initiators usable in the case of a resin system having a cationically polymerizable functional group include aromatic diazonium salts, aromatic sulfonium salts, aromatic iodonium salts, metallocene compounds, and benzoinsulfonic esters. They may be used alone or as a mixture of two or more.

The amount of the photopolymerization initiator added may be 0.1 to 10 parts by weight based on 100 parts by weight of the ionizing radiation-curable resin composition.

The following organic reactive silicon compounds may be used in combination with the ionizing radiation-curable resin composition.

A first type of organosilicon compounds usable herein includes those represented by formula $R_mSi(OR')_n$ wherein R and R' each represent an alkyl group having 1 to 10 carbon atoms and m (subscript of R) and n (subscript of R') are each an integer with m+n=4.

Specific examples of this type of organosilicon compounds include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

A second type of organosilicon compounds usable in combination with the ionizing radiation-curable resin composition is a silane coupling agent.

Specific examples of silane coupling agents usable herein include γ-(2-aminoethyl)aminopropyltrimethoxysilane, γ-(2-aminoethyl)aminopropylmethyldimethoxysilane, β-(3,4-epoxycyclohexyl)ethyltrimethoxysilane, γ-aminopropyltriethoxysilane, γ-methacryloxypropylmethoxysilane, N-β-(N-vinylbenzylaminoethyl)-γ-aminopropylmethoxysilane hydrochloride, γ-glycidoxypropyltrimethoxysilane, aminosilane, methylmethoxysilane, vinyltriacetoxysilane, γ-mercaptopropyltrimethoxysilane, γ-chloropropyltrimethoxysilane, hexamethyldisilazane, vinyltris(β-methoxyethoxy)silane, octadecyldimethyl[3-(trimethoxysilyl)propyl]ammonium chloride, methyltrichlorosilane, and dimethyldichlorosilane.

A third type of organosilicon compounds usable in combination with the ionizing radiation-curable resin composition is an ionizing radiation-curable silicon compound.

Specific examples of ionizing radiation curing silicon compounds usable herein include organosilicon compounds, containing a plurality of functional groups capable of being reaction crosslinked upon exposure to an ionizing radiation, for example, polymerizable double bond groups, having a molecular weight of not more than 5,000. More specifically, this type of organosilicon compounds include polysilanes terminated on one end with a vinyl functional group, polysilanes terminated on both ends with a vinyl functional group, polysiloxanes terminated on one end with a vinyl functional group, polysiloxanes terminated on both ends with a vinyl functional group, and vinyl-functional polysilanes or vinyl-functional polysiloxanes obtained by reacting these compounds. Specific examples of reactive organosilicon compounds usable herein include the following compounds.

(a)

(b)

(c)

(d)

(e)

In formulae (a) to (e), $R^1$ and $R^2$ each independently represent an alkyl group having 1 to 4 carbon atoms, and a to d and n are each such a number as will bring the molecular weight of the compound to not more than 5,000.

Other organosilicon compounds usable in combination with the ionizing radiation-curable resin composition include (meth)acryloxysilane compounds, such as 3-(meth)acryloxypropyltrimethoxysilane and 3-(meth)acryloxypropylmethyldimethoxysilane.

Figure 2A:
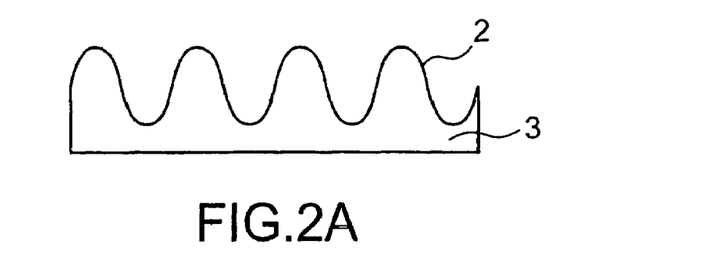
FIGS. 2A, 2B, 2C, 2D, and 2E are cross-sectional views showing embodiments of the form of fine concaves and convexes provided on the surface of an antireflection film.
Figure 2B:
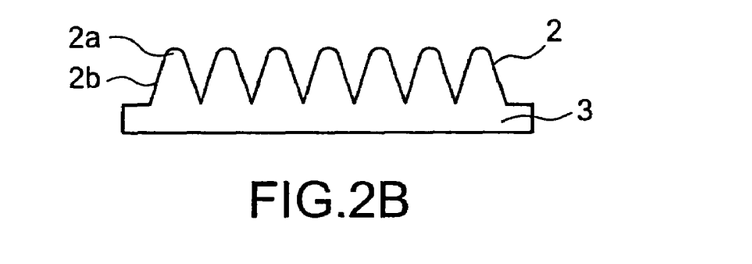
Figure 2C:
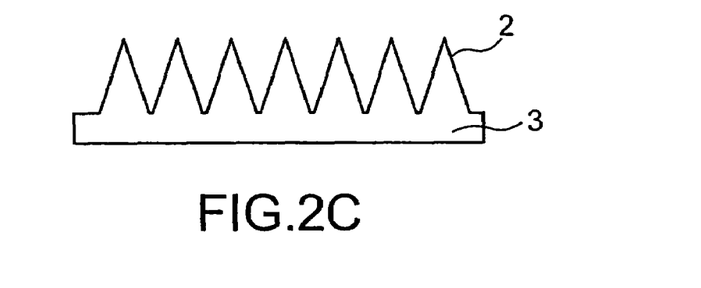
Figure 2D:
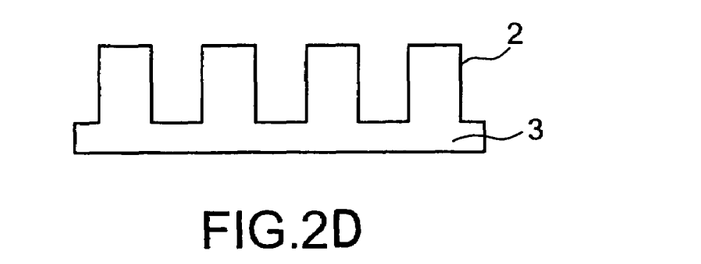

Shapes of fine concaves and convexes 2 at a pitch of not more than the wavelength of light formed on the top of the transparent layer 3 include: a shape as illustrated in FIGS. 1 and 2A wherein the fine concaves and convexes 2 at the upper edge of section are in a sine curve form; and shapes wherein the fine concaves and convexes 2 at the upper edge of section are in a form other than the sine curve form, for example, a shape as illustrated in FIG. 2B wherein the section in its apex 2a is in an arc form, a rise portion 2b is linear, and the convex is tapered off to a point, a triangular wave shape as illustrated in FIG. 2C, and a rectangular wave shape as illustrated in FIG. 2D.

Among them, the profiles as shown in FIGS. 2A, 2B, and 2C, wherein the depth varies from place to place, are preferred, and when these profiles are used, the light refractive index varies according to the position in the thicknesswise direction of the transparent layer 3.

In the case of the profile shown in FIG. 2D among these profiles, the area of the horizontal cut surface does not vary in any height portion, and, hence, the proportion of the transparent layer 3 is the same and the light refractive index in the upper portion of the wave is identical to that in the lower portion of the wave. A layer having a constant and predetermined refractive index may be formed by fixing the pitch and the width of the wave.

Figure 2E:
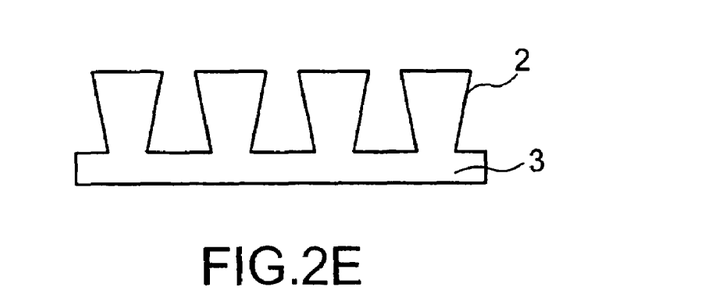

In addition, the shape as shown in FIG. 2E, wherein the convex is not tapered off to a point, is also possible. This shape, however, is unfavorable because, in the production of the shape using a mold, the separation from the mold is difficult.

Figure 3A:
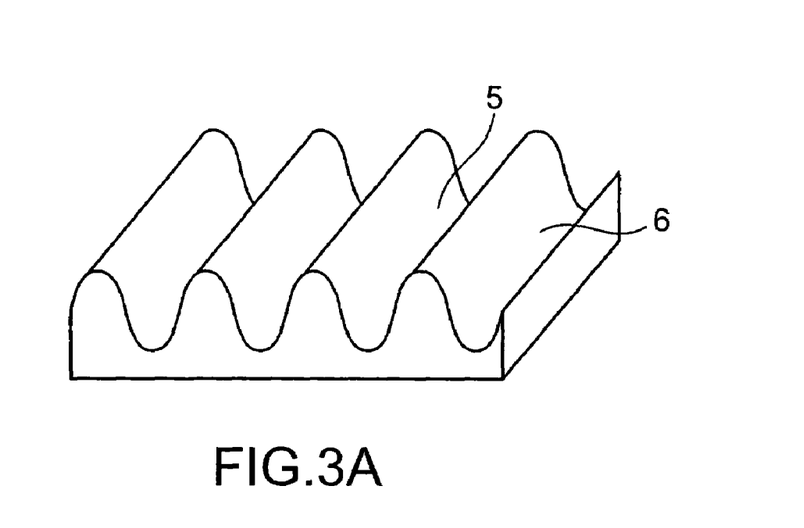
FIGS. 3A, 3B, and 3C are diagrams showing the arrangement of concaves and convexes.
Figure 3B:
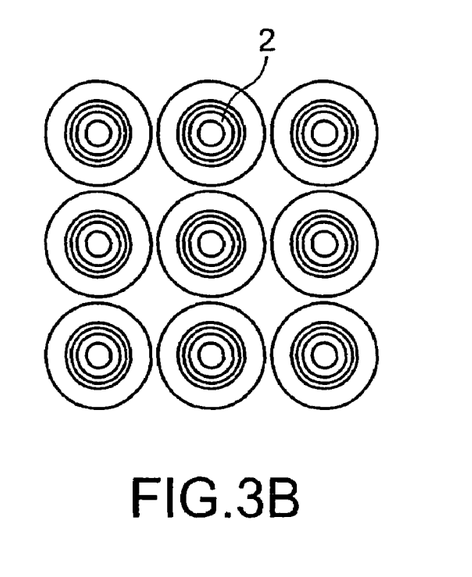
Figure 3C:
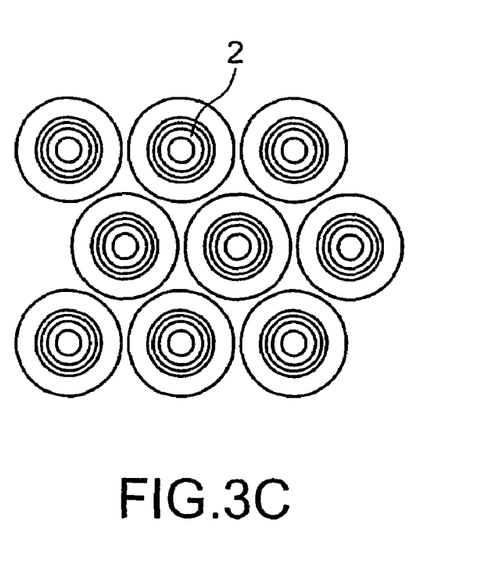

In the transparent layer 3 having the above profile, the fine concaves and convexes may be arranged so that, as viewed from the side of the concave-convex portion 2, when attention is given to concaves, as shown in FIG. 3A (perspective view), parallel grooves 5 (parallel partitions 6 when attention is given to convexes) are provided, or so that, as shown in FIG. 3B or 3C (as viewed from the top), the fine concaves and convexes are arranged in a planar form (wherein the concentric circles represent contour lines).

All the above types have antireflection properties. The groove type as shown in FIG. 3A, however, has directional properties, and, thus, the reflectance may vary according to the direction of incident light. On the other hand, the two-dimensionally arranged type as shown in FIG. 3B or 3C is substantially free from directional properties and thus is preferred.

Although there are a wide variety of shapes in the concave-convex portion 2, the pitch (=cycle) of waves in concaves and convexes, which appear in the profile, is very small and is not more than the wavelength of light, preferably not more than 300 nm. Although there is no particular lower limit of the pitch, the pitch is preferably not less than 100 nm when the accuracy of the mold is taken into consideration.

When the difference of elevation in the waves of the concave-convex portion is larger, the reflectance is lower and the antireflective effect is better. For this reason, the difference of elevation is preferably not less than 100 nm. Although there is no particular upper limit of the difference of elevation, when the pitch is usually assumed to be 200 to 300 nm, the difference of elevation is preferably about 50 to 200% of the pitch value, that is, about 100 to 600 nm.

The concave-convex portion of fine concaves and convexes may be formed using the ionizing radiation-curable resin composition on the top surface of the transparent layer 3, for example, by a method wherein, in the formation of the transparent layer 3 by coating, the coating is covered with an embossing film having concaves and convexes and, in this state, the coating is cured, a method wherein embossing means, such as embossing roll, pressed against the coating while optional heating, or a method wherein a transfer film, from which a transparent layer 3 can be transferred, is prepared by coating on a releasable substrate having concaves and convexes on its releasable face and the transparent layer 3 is then transferred using the transfer film.

A more preferred method for forming the concave-convex portion is as follows.

At the outset, an assembly of a photosensitive resin stacked on a suitable substrate is provided, and is exposed by laser beam interference. In this case, a photosensitive material, provided with a film, commercially available as a photosensitive material for the production of relief holograms may be utilized. The exposure is carried out by interference of two or more divided larger beams. Thus, cured portions and uncured portions are formed at a pitch of not more than the wavelength of light. After the exposure, development is carried out by a method according to the type of the photosensitive resin, usually by a method wherein uncured portions are removed by a specific solvent, thereby preparing an original mold having a concave-convex surface of innumerable fine concaves and convexes at a pitch of not more than the wavelength of light.

The original mold is formed of a polymer having a relatively low molecular weight from the viewpoint of facilitating the formation of the concaves and convexes, and thus has unsatisfactory solvent resistance. In addition, this original mold is fragile. Therefore, the repetition of replication using this original mold a large number of times is not favorable.

To overcome this problem, a method is preferably adopted wherein the original mold is plated with a metal such as nickel to prepare a first metallic mold which may be then used for replication. Alternatively, the first metallic mold is further plated to prepare several second metallic molds which are then used for replication. These metallic molds are in many cases called metallic stampers.

More preferably, use is made of a mold roll wherein the shape of the mold surface thus obtained has been formed on a roll surface and, if necessary, this has been brought to a composer form (multi-side attachment on an identical plate surface), or a mold roll wherein the shape of the mold surface has been continuously formed in a roll face direction and a circumferential direction.

In the replication of the shape of the mold surface, the shape of the original mold is the same as the shape of the second metallic mold, while the shape of the original mold is reverse to that of the first metallic mold. Further, the shape of fine concaves and convexes in the antireflection film is reverse to the shape of fine concaves and convexes on the surface in the mold for the production of the antireflection film. Therefore, in order to provide a desired shape as the antireflection film, if necessary, the shape of the fine concaves and convexes may be reversed in addition to the formation of the metal mold using plating. In this case, however, when the profile of the fine concaves and convexes is, for example, a sine curve form, there is an exceptional case where the original shape is not different from the reverse shape of the mold.

In the following description, except for the above exceptional case, the shape of fine concaves and convexes on the surface of the mold is assumed to be reverse to the desired shape of fine concaves and convexes in an antireflection film.

Figure 4:
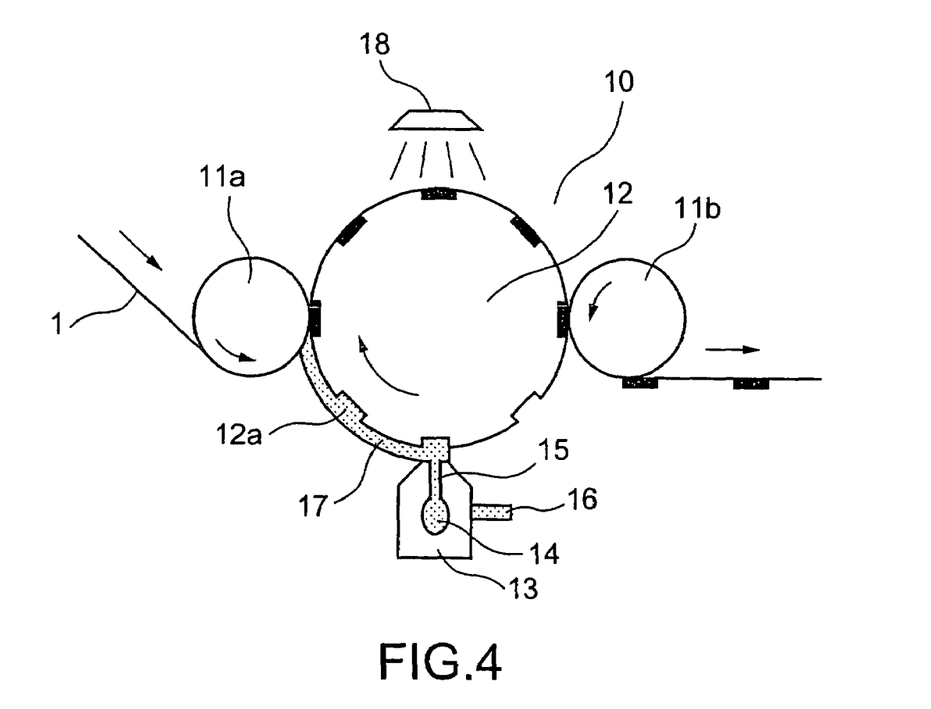
FIG. 4 is a diagram showing a production apparatus.

FIG. 4 illustrates the production of an antireflection film in a continuous manner by means of an apparatus 10 using a mold roll.

In FIG. 4, the transparent substrate film 1 is unwound from above on the left in the drawing, is guided between the nip roll 11a and the mold roll 12, is traveled halfway round the mold roll 12 on its upper side, is passed through between the mold roll 12 and a nip roll 11b, and is then discharged toward the right side.

The mold roll 12 is driven so as to rotate clockwise as indicated by an arrow within the mold roll 12. The nip rolls 11a and 11b are free-run according to the rotation of the mold roll (the nip rolls 11a and 11b are rotated as indicated by respective arrows within the rolls). A brake is installed on the unwinding side of the transparent substrate film 1, and the tension during travel can be regulated by the brake together with a winding motor provided on the discharge side of the transparent substrate film 1. Further, the tension is kept constant between both the nip rollers 11a and 11b.

A die head 13 is installed just under the mold roll 12. The die head 13 is constructed so that a liquid reservoir 14 is provided in its interior, a slit 15 is provided in its upper part, and an ionizing radiation-curable resin composition 17 is externally fed through a pipe 16.

A necessary amount of the ionizing radiation-curable resin composition 17 is extruded upward from the slit 15 according to the travel of the transparent substrate film 1, is coated on the surface of the mold roll, and is also filled into concaves 12a in the mold roll 12, and, when the ionizing radiation-curable resin composition 17 is passed through between the nip roll 11a and the mold roll, the coverage is regulated.

An ionizing radiation exposure system 18 is installed above the mold roll 12. When the transparent substrate film 1 is passed under the exposure system 18, an ionizing radiation is applied to crosslink and cure the ionizing radiation-curable resin composition on the transparent substrate film 1, whereby the transparent layer 3 is adhered to the transparent substrate film 1.

Thereafter, the cured transparent layer 3, together with the transparent substrate film, is wound.

When the transparent substrate film 1 is laminated, at least the concaves 12a on the surface of the mold roll are filled with the ionizing radiation-curable resin composition, and, in this case, the contact of the transparent substrate film with the exposed surface of the ionizing radiation-curable resin composition filling the concaves 12a suffices for contemplated results. On the other hand, when the transparent substrate film is not used, the ionizing radiation-curable resin composition is preferably applied in an amount large enough for the ionizing radiation-curable resin composition to form a continuous film on the surface of the mold.

In the embodiment shown in the drawing, the ionizing radiation-curable resin composition is applied onto the mold roll 12, and this is preferred. However, when the inclusion of air bubbles at the time of lamination can be prevented, a method may be used wherein the ionizing radiation-curable resin composition is applied on the transparent substrate film 1 side followed by contact with the mold roll 12.

After the ionizing radiation-curable resin composition is coated on the surface of the mold roll 12, if necessary, a doctor ring may be applied.

In the above embodiment, ultraviolet light or electron beam is generally used as the ionizing radiation. However, other ionizing radiation may be used. The number of exposure system disposition sites is not limited to one above the mold roll 12, and a desired number of ionizing radiation exposure systems may be installed at any sites between just after coating and the passage through the nip roll 11b. When a satisfactory space cannot be ensured around the mold roll 12, an ionizing radiation exposure system may be further installed at a position after the nip roll 11b to further apply the ionizing radiation.

Curing of the ionizing radiation-curable resin composition 17 by the application of the ionizing radiation creates adhesion between the cured product of the ionizing radiation-curable resin composition 17 and the transparent substrate film 1. Therefore, after the curing, the separation of the cured product of the ionizing radiation-curable resin composition 17 together with the transparent substrate film 1 can provide an antireflection film wherein a transparent layer 3 formed of a cured product of the ionizing radiation-curable resin composition is stacked on the transparent substrate film 1 and fine concaves and convexes, which reflect the shape of fine concaves and convexes of the mold surface, are provided on the surface of the transparent layer 3.

When the production of an antireflection film not provided with the transparent substrate film is contemplated, a method may be adopted wherein the lamination of the transparent substrate film is omitted. Alternatively, an antireflection film not provided with the transparent substrate film 1 may be produced by a method wherein the separability is imparted to the transparent substrate film 1 on its surface to be coated with the ionizing radiation-curable resin composition and the transparent substrate film 1 is separated simultaneously with the separation of the transparent layer from the mold surface, only the transparent substrate film 1 is first separated followed by separation of the transparent layer 3, or the transparent layer 3 together with the transparent substrate film 1 is first separated followed by separation of the transparent substrate film 1. The use of the transparent substrate film 1 during the process is preferred because the thickness of the transparent layer 3 can be easily regulated and the influence of dust in the air can also be avoided.

The antireflection film 1 according to the present invention, even in such a state that the fine concaves and convexes 2 are exposed on the surface, can exhibit satisfactory effect. Preferably, however, a layer 4 formed using a resin composition having a lower light refractive index than the transparent layer 3 is stacked on the fine concaves and convexes 2 from the viewpoint of preventing scratching or staining caused by accidental contact.

The formation of the layer 4 from a fluororesin or a silicone resin is preferred because the light refractive index is 1.3 to 1.4 which is generally lower than the refractive index of the transparent layer 3 formed of a cured product of the ionizing radiation-curable resin composition (that is, a cured product of acrylate resin composition which has a light refractive index of not less than 1.5). Further, this is also preferred from the viewpoint of a contact angle between the material and water of not less than 100 degrees which indicates that antifouling properties can also be provided.

When the necessity of imparting a special function to the layer 4 is not very high due to the use of the fluororesin, silicone resin or the like, the layer 4 may be formed of a thermoplastic resin, other than the fluororesin and silicone resin, which is selected in consideration of the adhesion of the underlying transparent layer 3.

The above material may be applied by a dry process, such as vapor deposition, or a wet process, such as conventional coating. A method may also be adopted wherein the material is previously coated on the mold surface for imparting fine concaves and convexes to the transparent layer 3 and the ionizing radiation-curable resin composition is applied on the coating, whereby the layer 4 is stacked.

When a transparent layer is formed from a mixture of the fluororesin or silicone resin with the ionizing radiation-curable resin composition for the transparent layer 3, the fluororesin or the silicone resin may be bled out.

In the antireflection film according to the present invention, in addition to the above construction, treatment may be carried out including antistatic treatment for preventing the deposition of dust during the use of the antireflection film or tackiness-imparting treatment on the antireflection film in its side remote from the fine concaves and convexes 2 from the viewpoint of the convenience of the application of the antireflection film.

Specifically, the antistatic treatment may be carried out by applying an antistatic agent or conductive fine particles. When the transparent layer 3 or the surface layer 4 is formed by coating, the antistatic agent or conductive fine particles may be mixed into the coating composition used followed by the application of the coating composition.

Alternatively, the antistatic treatment may be carried out by coating the antistatic agent per se on the transparent layer 3.

Further, the antistatic treatment may be carried out by forming a conductive layer, using a coating composition containing conductive fine particles, or a thin layer of a metal oxide under the transparent layer 3 or between the substrate film 1 and the transparent layer 3 when the transparent substrate film 1 is used.

The tackiness-imparting treatment may be carried out by directly coating a polyacrylic ester or a rubber pressure-sensitive adhesive. In general, a release paper with a pressure-sensitive adhesive coated thereon is laminated, and the release paper is allowed to remain unseparated until use from the viewpoint of avoiding accidental adhesion or deposition of dust due to the exposure of the pressure-sensitive adhesive.

The thickness of the pressure-sensitive adhesive layer is preferably about 20 to 40 μm.

Figure 5:
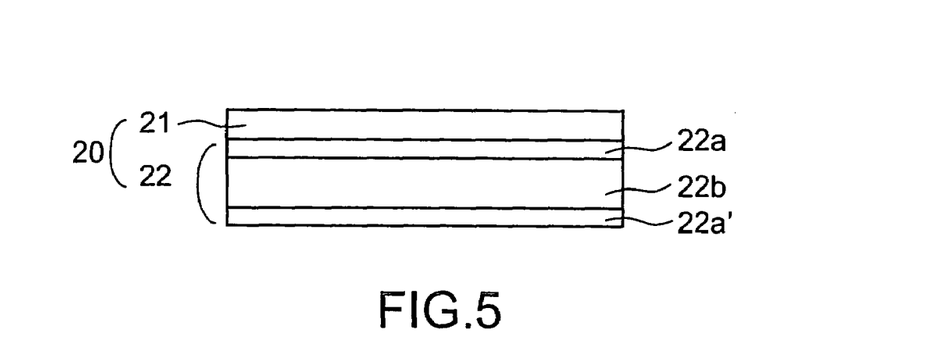
FIG. 5 is a cross-sectional view showing an embodiment of the application of an antireflection film to a polarizing plate.
Figure 6:
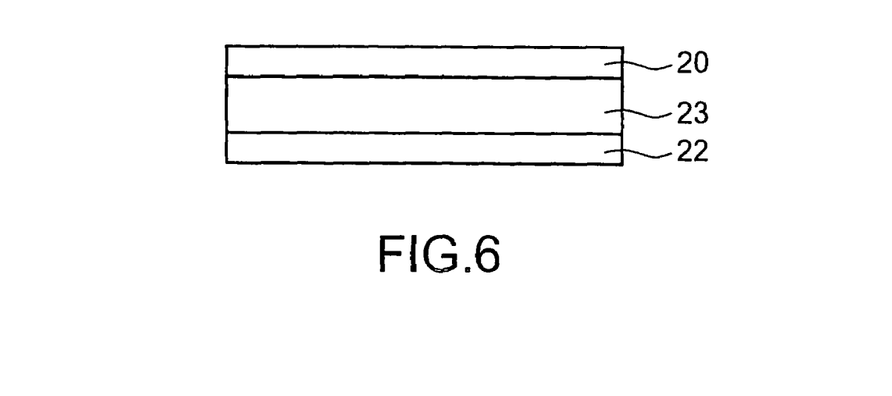
FIG. 6 is a cross-sectional view showing an embodiment of the application of an antireflection film to a liquid-crystal panel.

The antireflection film according to the present invention, as shown in FIGS. 5 and 6, is in many cases used in applications related to displays.

FIG. 5 is a cross-sectional view showing an embodiment of the application of the antireflection film to a polarizing plate. In this case, an antireflection film 21 is stacked on the top surface of a polarizing plate 22 having a three-layer structure of a surface layer 22a, a polarizing layer 22b, and a backside layer 22a' stacked in that order on top of one another to provide an antireflective polarizing element 20.

In this case, a construction may be adopted wherein the surface layer 22a is provided as the substrate and a transparent layer 3 stacked directly on the substrate. However, the stacking of the antireflection film subjected to the above tackiness-imparting treatment onto the polarizing plate 22 having the above three-layer structure is convenient from the practical point of view.

The antireflective polarizing plate comprising the antireflection film 21 stacked on the top surface of the polarizing plate 22 is very usefully applied onto liquid-crystal displays.

In FIG. 6, the antireflection polarizing plate 20 is stacked onto the top surface (=viewer side face) of a liquid-crystal panel 23 comprising a liquid crystal sandwiched between two glass plates which have a transparent electrode in their inner surface and face each other so that the antireflective polarizing plate 20 on its antireflection film 21 side faces outward. In general, a polarizing plate 22 is stacked on the underside of the liquid-crystal panel 23.

According to the above construction, the reflection of external light from the surface of the liquid-crystal display is prevented. Therefore, even under an environment such that external light, such as illumination or sunlight, cannot be avoided, there is no possibility that the external light is reflected and consequently the visibility of the display contents of the liquid-crystal display is lowered.

In addition, the antireflection film according to the present invention, when stacked on the surface of displays, such as CRT (cathode-ray tube) displays or plasma displays, or disposed on the viewer side, can inhibit the reflection of external light from the surface of the displays to prevent a lowering in visibility of display images.

Further, the antireflection film according to the present invention, when applied onto the surface of building materials of metals or glass or those having other gloss surface, can prevent accidental light reflection. This can eliminate the influence of reflection on the way of vehicles and pedestrians, and, at the same time, can prevent a reduction in visibility of the appearance inherent in them.

EXAMPLES

Example 1

A photosensitive resin was coated by a spinner onto a glass substrate with a diameter of 76 mm to prepare a photosensitive material. The photosensitive material was exposed by means of a laser interference exposure system using an argon laser (wavelength 351 nm) at an angle of incidence of 40 degrees from three directions. After the exposure, solvent development was carried out to prepare an original mold having fine concaves and convexes arranged lengthwise and breadthwise on a cured product of the photosensitive resin.

The pitch of concaves and convexes on the original mold was 280 nm, and the difference in level between concaves and convexes was 200 to 250 nm.

The surface of the original mold was electrolessly plated, followed by plating with nickel to prepare a 100 μm-thick duplicate mold. This procedure was repeated to prepare duplicate molds. A large mold having a width of 500 mm and a length of 980 mm was prepared by multi-side attachment of the duplicate molds thus obtained.

This large mold was applied to a roll with a diameter of 300 nm (circumference 980 nm) to prepare a mold roll.

In this case, when the spacing of the seam is not less than 1 mm, an ionizing radiation-curable resin composition is filled into the gap, and this makes it difficult to separate a cured product of the ionizing radiation-curable resin composition from the mold. In order to prevent this unfavorable phenomenon, welding was carried out to fill the gap with the mold.

An acrylate ultraviolet-curable resin (stock number Z 9009, manufactured by Japan Synthetic Rubber Co., Ltd.; light refractive index after curing 1.59) was provided. In this case, the viscosity of the acrylate ultraviolet-curable resin was regulated to a value between 100 to 2000 cps by temperature control from the viewpoints of degassing and the reproduction of the mold shape. An easy-adhesion polyester resin film (A 4300, manufactured by Toyobo Co., Ltd.; thickness 125 μm) was provided as a transparent substrate film. Using the apparatus described above with reference to FIG. 4, the ultraviolet-curable resin was coated onto the mold roll, and a transparent substrate film was laminated onto the coating. Ultraviolet light was then applied to the ultraviolet-curable resin to cure the ultraviolet-curable resin. The cured product, together with the transparent substrate film, was separated from the mold roll. Thus, an antireflection film was prepared which comprised fine concaves and convexes provided on the surface of the cured film of the ultraviolet-curable resin.

Example 2

A fluororesin-based surface coating liquid was coated by dipping on fine concaves and convexes on the cured film in the antireflection film prepared in Example 1. The coating was then dried to prepare an antireflection film.

Fingerprints were applied onto the surface of this antireflection film, and the surface of the antireflection film was then wiped with cotton. As a result, the fingerprints could be wiped off.

Example 3

An antireflection film was prepared in the same manner as in Example 1, except that a coating composition (an ATO ultrafine particles coating composition, manufactured by Shinto Paint Co., Ltd.) containing ultrafine particles of ATO (antimony-doped indium tin oxide) was coated onto the easy-adhesion polyester resin film as used in Example 1.

Comparative Example

The mold roll prepared in Example 1 was provided as an embossing plate. Concaves and convexes were formed by heat embossing on a polycarbonate resin film (thickness 130 μm) using this mold roll. Thus, an antireflection film was prepared.

The antireflection films prepared in Examples 1 to 3 and the comparative example were measured for the average reflectance, the pencil hardness, and the charge decay. The results are shown in Table 1.

The average reflectance was measured in the wavelength range of 380 to 780 nm with MPC-3100 manufactured by Shimadzu Seisakusho Co., Ltd. The pencil hardness was measured with a pencil hardness tester EP-001 manufactured by Rigaku Kogyo. The charge decay was measured with a static honestmeter Type H-0110 manufactured by SHISHIDO ELECTROSTATIC, LTD.

TABLE 1

|  | Average reflectance | Pencil hardness (as measured according to JIS K 5400) | Charge decay |
| --- | --- | --- | --- |
| Ex. 1 | 0.5% | H | — |
| Ex. 2 | 0.5% | H | — |
| Ex. 3 | 1.3% | H | 4 sec |
| Comp. Ex. | 6% | B | — |

According to the present invention, the adoption of a structure comprising a transparent layer, formed of a cured product of an ionizing radiation-curable resin composition, and, provided on the surface of the transparent layer, a concave-convex portion with innumerable fine concaves and convexes at a pitch of not more than the wavelength of light can provide an antireflection film which can be easily produced by molding in a short time and, does not involve a corrosion problem, and has an even reflectance in a visible light region.

According to the second embodiment of the present invention, an antireflection film can be provided which, by virtue of backing of the transparent layer with a transparent substrate film, has advantages of higher strength and better flatness, in addition to the effect of the present invention.

According to the third embodiment of the present invention, an antireflection film can be provided which has advantages of a high surface pencil hardness of not less than H and in its turn less susceptibility to scratching, in addition to the effects of the first or second embodiment of the present invention.

According to the fourth embodiment of the present invention, an antireflection film can be provided which, by virtue of stacking of a layer having a lower refractive index than the transparent layer on the surface, has an advantage of excellent fastness properties and stain resistance of the surface, in addition to the above effects.

According to the fifth embodiment of the present invention, an antireflection film can be provided which, by virtue of antistatic properties imparted to the antireflection film, has an advantage of no significant deposition of dust, in addition to the effects of any one of the above embodiments of the present invention.

According to the sixth embodiment of the present invention, a polarizing element can be provided wherein the effects of the antireflection film of the present invention have been added to a polarizing plate.

According to the seventh embodiment of the present invention, a display device can be provided which additionally has the effects of the antireflection film as defined in any one of claims 1 to 5 according to the present invention and the effects of the polarizing element.

According to the eighth embodiment of the present invention, an antireflection film can be produced by a very efficient process wherein an ionizing radiation-curable resin composition is shaped by means of a mold, and the shape is then cured by the application of an ionizing radiation.

According to the ninth embodiment of the present invention, by virtue of the use of a separable transparent substrate film, in addition to the above effect of the present invention, an additional advantage can be attained such that an antireflection film consisting of a transparent layer alone can be efficiently produced.

According to the tenth embodiment of the present invention, in addition to the above effect of the present invention, an additional advantage can be attained such that an antireflection film comprising a stack of a transparent substrate film and a transparent layer and having higher strength and better flatness can be efficiently produced.

According to the eleventh embodiment of the present invention, in addition to the above effect of the present invention, an antireflection film having desired properties can be accurately and stably produced by an established process.

The invention claimed is:

1. A process for producing an antireflection film comprising: a transparent layer formed of a cured product of an ionizing radiation-curable resin composition, the transparent layer having a surface hardness of not less than H in terms of pencil hardness as measured according to JIS K 5400; a concave-convex portion provided on one side of the transparent layer, the concave-convex portion having a specific continuous and regular shape comprising fine concaves and convexes continuously provided at a predetermined pitch of not more than the wavelength of light; and a layer, provided on the fine concaves and convexes, formed of a resin composition having a lower light refractive index than a refractive index of the transparent layer, said process comprising the steps of:

providing a mold with an uneven surface having fine concaves and convexes continuously provided at a predetermined pitch of not more than the wavelength of light;

applying, onto the mold, an ionizing radiation-curable resin composition in an amount large enough to at least fill the concaves of the mold surface;

covering the top of the thus applied resin composition with a transparent substrate film;

curing the ionizing radiation-curable resin composition located between the transparent substrate film and the mold to produce a cured product of the ionizing radiation-curable resin composition; and separating the cured product from the mold to obtain the antireflection films, wherein the mold with an uneven surface having fine concaves and convexes is provided by forming concaves and convexes in a photosensitive resin by a laser beam interference method to produce an original mold and then producing a metallic stamper from the original mold by a plating method.

2. The process for producing an antireflection film according to claim 1, wherein the transparent substrate film on its side for covering the ionizing radiation-curable resin composition is separable and which further comprises the step of separably adhering the transparent substrate film, in curing the ionizing radiation-curable resin composition to produce a cured product, onto the cured product and separating the transparent substrate film from the cured product during, before or after the separation of the cured product from the mold.

3. The process for producing an antireflection film according to claim 1, which further comprises the step of adhering the transparent substrate film, in curing the ionizing radiation-curable resin composition to produce a cured product, onto the cured product and, in separating the cured product from the mold, separating the transparent substrate film together with the cured product.

* * * * *